Jan. 15, 1957  J. WEISER  2,777,636
MATHEMATICAL DEVICE FOR WRITING INSTRUMENTS
Filed Sept. 8, 1953
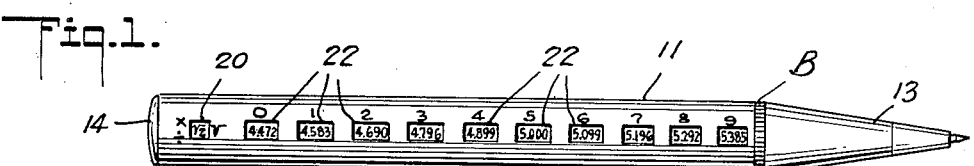
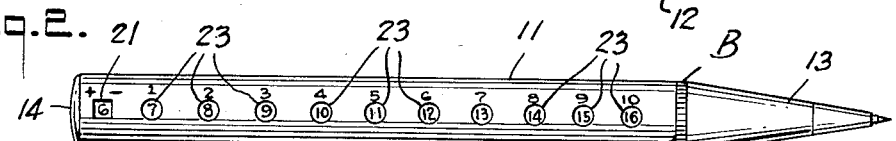
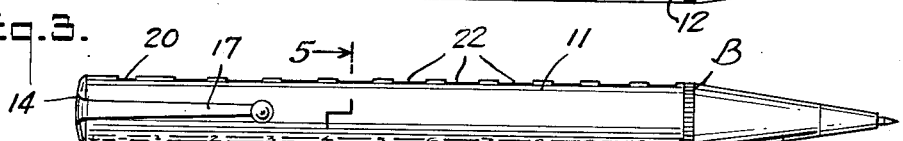
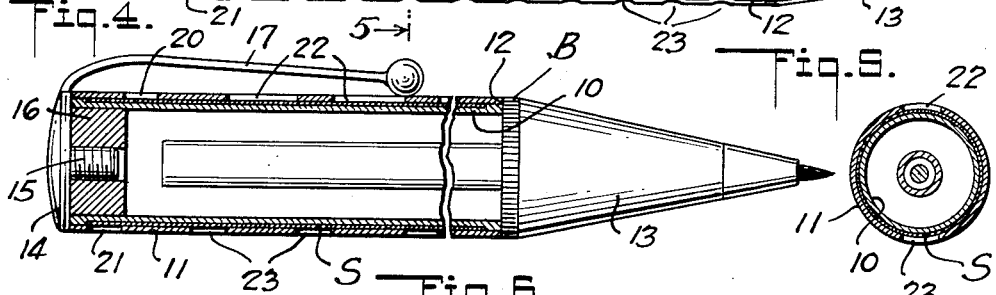
INVENTOR.
JACK WEISER
BY
Frederick Diehl
ATTORNEY

United States Patent Office 2,777,636
Patented Jan. 15, 1957

2,777,636

MATHEMATICAL DEVICE FOR WRITING INSTRUMENTS

Jack Weiser, Los Angeles, Calif.

Application September 8, 1953, Serial No. 378,835

6 Claims. (Cl. 235—87)

This invention relates to arithmetical devices for writing instruments of the general character embodied in my United States Letters Patent No. 2,646,220, issued July 21, 1953, and in which is disclosed and claimed a device particularly adapted, although not necessarily, for use by children and students in the study of elementary arithmetic, by enabling the answers to arithmetic problems to be directly read in response to various adjustments of the device.

The primary object of my present invention is to provide a mathematical device for writing instruments which has all the advantages of the device of my patent above set forth, and, in addition, is structurally simplified to enable the answers to various problems such as addition, subtraction, multiplication, division and square root to be directly read in response to an extremely simple manipulation of the device, all to the end of materially reducing the cost of manufacture of the device as well as facilitating and expediting its use.

More, specifically, it is a further object of my invention to provide a mathematical device for writing instruments of the above described character which is structurally characterized to enable a plurality of number tables to be selectively utilized in obtaining the answers to problems involving many different processes, solely by a simple relative adjustment of two telescopically associated elements, whereby to greatly extend the range of use of the device with an extremely simple construction inexpensive to manufacture.

With these and other objects in view, my invention resides in the combinations, arrangements and functional relationships of elements as set forth in the following specification and particularly pointed out in the appended claims.

In the accompanying drawings,

Figure 1 is a view of a writing instrument in side elevation with one form of mathematical device embodying my invention applied thereto;

Figure 2 is a view similar to Figure 1, with the device rotated through an angular distance of 180 degrees so as to show the opposite side of the device;

Figure 3 is a view similar to Figures 1 and 2 with the device rotated to a position medially between the positions of Figures 1 and 2;

Figure 4 is an enlarged fragmentary longitudinal sectional view of the device shown in the preceding figures;

Figure 5 is a transverse sectional view taken on the line 5—5 of Figure 3; and Figure 6 is a plan view of a typical number sheet embodied in the device.

Referring specifically to the drawings, my invention is shown for the purpose of illustration combined with a writing instrument such as a pencil having a conventional lead projecting and retracting mechanism (not shown) and comprising a body B. The body B is composed of one element in the form of a cylindrical barrel 10 (Figures 4 and 5) slightly reduced in diameter except at its ends to receive a number sheet S which is wrapped around the barrel and is permanently fixed thereto by a suitable adhesive.

Rotatably mounted on the barrel 10 so as to bear only on the full diameter thereof beyond the ends of the number sheet S is the other element of the body B in the form of a cylindrical casing or tube 11. The casing 11 is confined on the barrel against axial displacement relative to the latter by an annular shoulder 12 formed by the larger end of a tapered neck 13 at one end of the barrel and by a cylindrical head 14 at the other end of the barrel. The head 14 is provided with a screw threaded stud 15 screwed into a plug 16 having a press fit in the barrel, and from the head projects a spring clip 17 by which the pencil may be fastened in the pocket.

As shown in Figures 1 to 4, inclusive, the casing 11 is provided adjacent to its left hand end with a plurality of circumferentially spaced control openings or windows 20 and 21, which, in the present instance are 180 degrees apart. The windows 20 and 21 are also staggered or offset in a direction axially of the barrel 10 as is most clearly shown in Figures 3 and 4, and can be observed by a comparison of Figures 1 and 2.

Between the windows 20 and 21 and the right hand end of the casing, the latter is provided with rows of openings 22 and 23 extending longitudinally of the barrel and alined with the respective windows. The openings 22 are elongated longitudinally of the barrel and are consecutively numbered 0, 1, 2, 3, 4, 5, 6, 7, 8 and 9, whereas the openings 23 are circular and are consecutively numbered 1, 2, 3, 4, 5, 6, 7, 8, 9 and 10, all so as to have such definite values for co-action with the respective control windows 20 and 21 in a manner to be later described. The openings 22 and 23 are also staggered or offset relatively in a direction axially of the barrel 10 as is most clearly shown in Figures 3 and 4, and can be observed by a comparison of Figures 1 and 2.

In the present instance the number sheet S is provided with rows of numerals extending circumferentially and longitudinally of the barrel 10. The relationships and values of the number tables on the sheet are such that the answers to problems in multiplication, division and square root can be directly read by use of the control window 20 and the numbered openings 22 as shown in Figure 1, whereas the answers to problems in addition and subtraction can be directly read by the use of the control window 21 and the numbered openings 23.

Alternate circumferential rows 25 of numbers on the sheet S constitute a table for use in multiplication, division and square root, whereas the other alternate rows 26 of numbers on the sheet constitute a second table for use in addition and subtraction problems. Two circumferential rows 27 and 28 of control numbers are arranged at the left hand end of the aforesaid tables for co-action with the tables 25 and 26, respectively, and are arranged to appear in the windows 20, and 21, respectively, in response to relative rotation of the barrel and casing.

To indicate the particular use of the control windows 20 and 21, the window 20 is provided with multiplication, division and square root signs, whereas the window 21 is provided with addition and subtraction signs, all of which are suitably applied to the casing as shown in Figures 1 and 2.

In operation, the answers to problems in multiplication, division and square root can be directly read in the openings 22 in conjunction with the control window 20 by simply rotating the barrel and casing relatively. For example, it will be noted from Figure 1 that to obtain the square root of any one of 20, 21, 22, 23, 24, 25, 26, 27, 28 or 29, the rotational adjustment of the barrel and casing is effected to dispose the square root control number "2" in the control window 20. Assuming that the square root of "24" is desired, the square root can be read directly in that one of the openings 22 having the value of 4, and is "4.899."

It will be clear that to obtain the square root of any number within the range of the table 25, that the number representing the value of any one of the openings 22 is to be considered as being in the units place of the number of which it is desired to obtain the square root, whereas the square root control numbers in the window 27 are to be considered as being in the tens place. Likewise, the answers to multiplication problems as well as division problems can be directly read in the openings 22 and the control window 20, respectively, by relatively rotating the barrel and casing to the desired position.

For use in obtaining the answers to problems in addition and subtraction, the openings 23 are utilized in conjunction with the respective control window 21 rather than the openings 22 and the control window 20 as above described. For example, to add "6" to "9," the barrel 10 and casing 11 are relatively rotated until the number "6" appears in the window 21 as shown in Figure 2. The sum "15" can be read directly in that one of the openings 23 having the indicated value of 9. Conversely, to subtract "6" from "15," the process is reversed by merely reading as the answer the indicated value 9 of that one of the openings 23 in which the number 15 appears.

From the foregoing description it will be manifest that a large variety of problems may be solved in a compactly arranged device by providing the plurality of control windows and the plurality of rows of value-bearing openings respectively co-actable with the control windows and arranged at spaced locations circumferentially of the casing, all by a simple relative rotational adjustment of the barrel and casing, to the end of greatly extending the range of use of the device with an extremely simple construction thereof.

I claim:

1. In an instrument of the class described, a mathematical device comprising: a barrel having thereon a plurality of tables for respectively different branches of mathematical computations, each table being composed of circumferentially extending rows of numbers, with the rows of one table alternating with the rows of the other table along the length of the barrel; said barrel having rows of circumferentially extending control numbers, one row for each of said tables; a casing rotatably mounted on said barrel and having a plurality of circumferentially spaced rows of openings, one row for each of said tables and extending longitudinally of the barrel; said openings being provided with accompanying indicia designating predetermined number values for the respective openings; said casing having circumferentially spaced control windows, one for each of said rows of control numbers, in which control numbers of the respective rows thereof will appear when predetermined numbers of the respective tables thereof appear in the openings of the respective rows thereof.

2. In an instrument of the class described, a mathematical device comprising: a barrel having thereon a plurality of tables for respectively different branches of mathematical computations, each table being composed of circumferentially extending rows of numbers, with the rows of one table alternating with the rows of the other table along the length of the barrel; said barrel having rows of circumferentially extending control numbers, one row for each of said tables; a casing rotatably mounted on said barrel and having a plurality of circumferentially spaced openings extending longitudinally of the barrel, with the openings of one row being staggered relative to the openings of the other row for co-action, respectively, with numbers of the respective tables; said openings having accompanying indicia designating predetermined number values for the respective openings; said casing having circumferentially spaced and longitudinally offset control windows, one for each of said rows of control numbers, in which control numbers of the respective rows thereof will appear when predetermined numbers of the respective tables thereof appear in the openings of the respective rows thereof; and means on the barrel and casing confining them to relative rotational adjustment.

3. In an instrument of the class described, two elements arranged in telescoped relation for relative rotational adjustment; the inner one of said elements having a plurality of tables for respectively different branches of mathematical computations, each table being composed of circumferentially extending rows of numbers, with the rows of one table alternating with the rows of the other table along the length of such element; the inner element having rows of circumferentially extending control numbers, one for each of said tables; the outer one of said elements having a plurality of selectably usuable circumferentially spaced rows of openings, one row for each of said tables and extending longitudinally of the inner element; said openings having accompanying indicia designating predetermined number values for the respective openings; said outer element having selectably usable, circumferentially spaced control windows, one for each of said rows of control numbers, in which control numbers of the respective rows thereof will appear when predetermined numbers of the respective tables thereof appear in the openings of the respective rows thereof.

4. In an instrument of the class described, two elements arranged in telescoped relation for relative rotational adjustment; the inner one of said elements having a plurality of tables for respectively different branches of mathematical computations, each table being composed of circumferentially extending rows of numbers, with the rows of one table alternating with the rows of the other along the length of such element; the inner element having rows of circumferentially extending control numbers, one for each of said tables; the outer one of said elements having a plurality of selectably usable circumferentially spaced rows of openings extending longitudinally of the element, with the openings of one row being staggered relative to the openings of the other row for co-action, respectively, with numbers of the respective tables; said openings having accompanying indicia designating predetermined number values for the respective openings; said outer element having selectably usable circumferentially spaced and longitudinally offset control windows, one for each of said rows of control numbers, in which control numbers of the respective rows thereof will appear when predetermined numbers of the respective tables thereof appear in the openings of the respective rows thereof; and means confining said elements to relative rotational adjustment.

5. In an instrument of the class described, a mathematical device comprising: a barrel having a plurality of tables for respectively different branches of mathematical computations, each table being composed of circumferentially extending rows of numbers, with the rows of one table alternating with the rows of the other table along the length of the barrel; said barrel having rows of circumferentially extending control numbers, one row for each of said tables; a casing rotatably mounted on said barrel and having a plurality of circumferentially spaced rows of openings, one row for each of said tables and extending longitudinally of the barrel; said openings being provided with accompanying indicia designating predetermined number values for the respective openings; said casing having circumferentially spaced control windows, one for each of said rows of control numbers, in which control numbers of the respective rows thereof will appear when predetermined numbers of the respective tables thereof appear in the openings of the respective rows thereof; the openings of one of said rows thereof being of different configuration from that of the openings of the other of said rows thereof so as to enable one row to be readily distinguished from the other for selective use thereof in performing computations in the aforesaid different branches of mathematics.

6. In an instrument of the class described, two elements arranged in telescoped relation for relative rotational adjustment; the inner one of said elements having a plurality of tables for respectively different branches of mathematical computations, each table being composed of circumferentially extending rows of numbers, with the rows of one table alternating with the rows of the other table along the length of such element; the inner element having rows of circumferentially extending control numbers, one for each of said tables; the outer one of said elements having a plurality of selectably usable circumferentially spaced rows of openings extending longitudinally of the element, with the openings of one row being staggered relative to the openings of the other row for co-action, respectively, with numbers of the respective tables; said openings having accompanying indicia designating predetermined number values for the respective openings; said outer element having selectably usable circumferentially spaced and longitudinally offset control windows, one for each of said rows of control numbers, in which control numbers of the respective rows thereof will appear when predetermined numbers of the respective tables thereof appear in the openings of the respective rows thereof; and means confining said elements to relative rotational adjustment; the openings of one of said rows thereof being distinctively different in appearance from that of the other of said rows thereof so as to facilitate selective use of the rows in performing computations in the aforesaid different branches of mathematics.

References Cited in the file of this patent

UNITED STATES PATENTS 2,646,220     Weiser _____ July 21, 1953

FOREIGN PATENTS 19,138     Australia _____ Mar. 26, 1929